United States Patent [19]
Frederic

[11] Patent Number: 5,596,359
[45] Date of Patent: Jan. 21, 1997

[54] PRINTER APPARATUS WITH ADJUSTABLE PRINTING SPEED

[75] Inventor: Alain Frederic, Cergy, France

[73] Assignee: Societe d'Applications Generales d'Electricite et de Mecanique SAGEM, France

[21] Appl. No.: 285,418

[22] Filed: Aug. 3, 1994

[30] Foreign Application Priority Data

Aug. 3, 1993 [FR] France ................... 93 09541

[51] Int. Cl.⁶ ................ B41J 2/36; B41J 2/37; B41J 2/365
[52] U.S. Cl. ................................................. 347/188
[58] Field of Search .................... 347/171, 251, 347/900, 237, 132, 211, 188; 358/502, 503, 296, 298, 501, 404, 444

[56] References Cited

U.S. PATENT DOCUMENTS 4,300,142  11/1981  Kos ............................ 347/188
4,521,813   6/1985  Yoshida et al. ............. 358/296
4,628,368  12/1986  Kurata et al. .............. 358/497

OTHER PUBLICATIONS

English Translation of Patent Abstracts of Japan, vol. 15, No. 502 (E–1147), 18 Dec. 1991, & JP-A-03 219 764 (Matsushita Graphic . . . Inc.).
English Translation of Patent Abstracts of Japan, vol. 14, No. 144, (M–951), 19 Mars 1990 & JP-A-02 009 654 (Matsushita Graphic . . . Inc.).

Primary Examiner—Benjamin R. Fuller
Assistant Examiner—L. Anderson
Attorney, Agent, or Firm—Graham & James LLP

[57] ABSTRACT

Printing apparatus including a printing head (1), which apparatus comprises a buffer memory (7), designed to be filled, at a defined speed, by data representing lines to be printed on a printing medium (11) and to be emptied line by line for each printing of a line by the head, and computation member (6) designed to determine, prior to the printing of each line, the volume of buffer memory (7) remaining available (L–xi), to determine therefrom a printing speed (Xj) of the line in question and accordingly to control member (3) for adjusting the printing speed (Xj) of the head (1).

5 Claims, 2 Drawing Sheets

5,596,359

PRINTER APPARATUS WITH ADJUSTABLE PRINTING SPEED

FIELD OF THE INVENTION

The present invention relates to a printing apparatus including a printing head.

DISCUSSION OF RELATED ART

In the context of printing head, mention may be made of thermal heads, ink-jet heads, etc.

In the context of printing apparatus, mention may, for example, be made of a facsimile machine. This receives, from a remote facsimile machine, coded data representing successive lines to be printed. When a line includes few sequences of black points or white points, it is encoded by very little data, so that these data are transmitted more rapidly than in the case of a line having a large number of black or white sequences. Because of this, the reception speed of the data set of a line is variable. However, this speed is limited by the protocol exchanged with the remote facsimile machine, the printing head being preset for a maximum line reception speed.

Presetting the maximum speed of the head generally reduces to overestimating its supply speed.

The present invention aims to overcome this handicap.

SUMMARY OF THE INVENTION

For this purpose, the invention relates to a printing apparatus including a printing head, which apparatus comprises a buffer memory and computation means designed to determine, prior to the printing of each line, the volume of buffer memory remaining available, to determine therefrom a printing speed of the line in question and accordingly to permit control of means for adjusting the printing speed of the head.

By virtue of the invention, the printing speed can thus be matched to the data reception speed and, in particular, be increased when the remaining buffer memory volume available is less than the defined threshold.

In order, however, best to avoid the occurrence of passage to a high printing speed which can lead to degradation of the printing quality, it is suitable to provide computation means designed to write into the memory, in the form of at least one codeword, the data representing a line.

The occupation of the memory thus increases only slightly in such a case.

Similarly, provision may be made for the computation means to be designed to determine the position on the page of the line to be printed and to determine the corresponding printing speed as a function of this position.

It is thus possible best to determine the risk of spill-over and, for example at the end of a page, not to increase the printing speed even if the memory is substantially full, because there will be a reception dead time making it possible to empty the memory.

It is particularly advantageous for the computation means to be designed to control line feed means of means for driving the printing medium.

BRIEF DESCRIPTION OF THE DRAWINGS

The invention will be better understood with the aid of the following description of the preferred embodiment of the printing apparatus of the invention, with reference to the attached drawing, in which.

DETAILED DESCRIPTION OF THE PREFERRED EMBODIMENT

Figure 1:
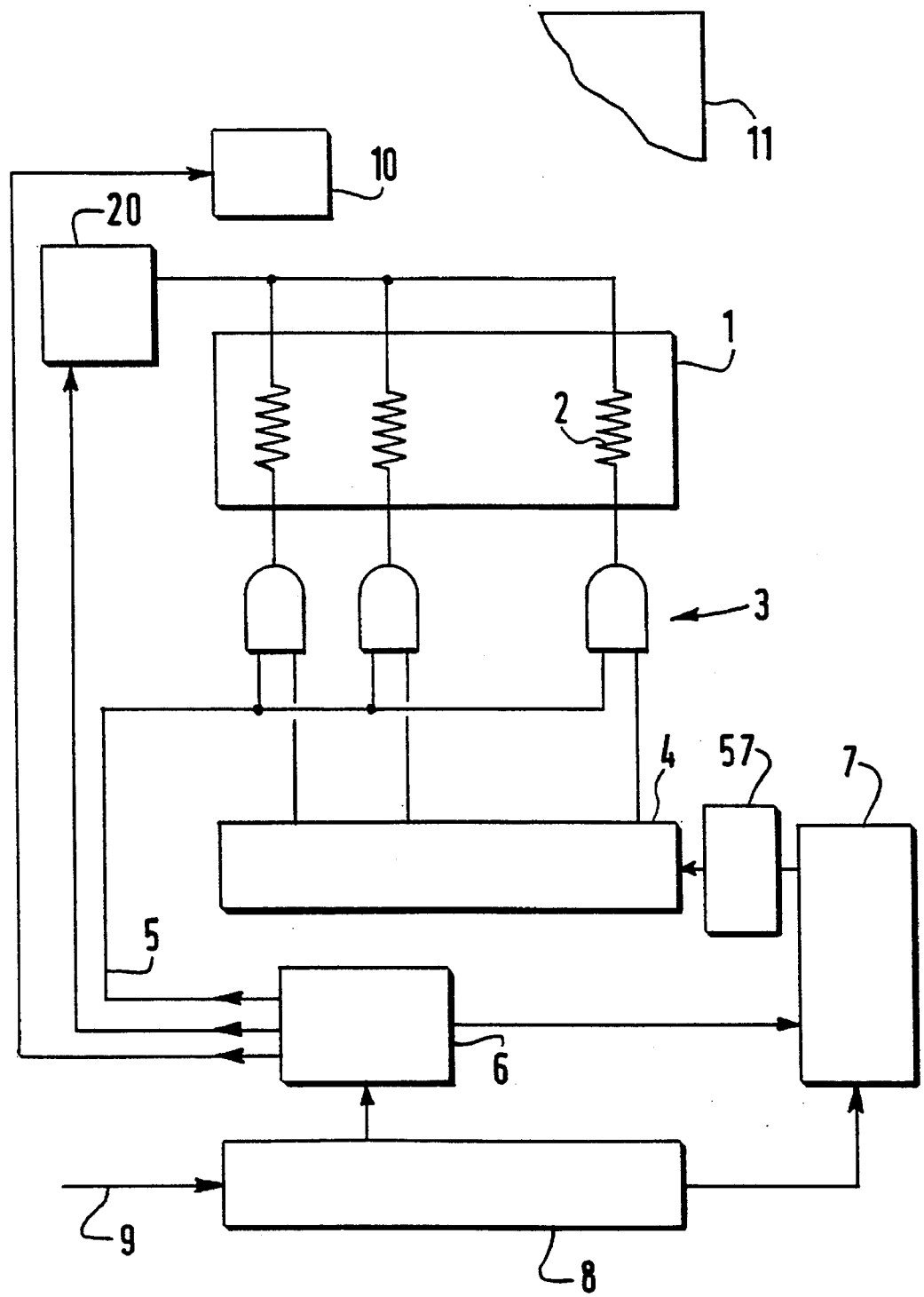
FIG. 1 is a block diagram of the printing apparatus of the invention.

The printing apparatus of the invention is here a thermal printer of a facsimile machine. It includes a thermal printing head 1 provided with a plurality of heating elements 2, arranged in blocks, supplied by a continuous supply source 20 which is, in this case, adjustable. Each heating element 2 is controlled by a gate 3 with two inputs, one of which is connected to a separate output of a printing buffer register 4 and the other of which is connected to a control link 5, common to all the gates 3 and coming from a microprocessor 6. For clarity of the diagram, only one wire has been represented, although there are others, for sequentially supplying the other heating element blocks 2. A buffer memory 7 is filled with data representing successive lines to be printed, coming from a reception register 8 connected at its input to a telephone line 9 transmitting these data. The microprocessor 6 is also connected to the output of the reception register 8 and to the memory 7.

In this example, a stepper motor 10 is provided which is controlled by the microprocessor 6 and which controls a feed roller, not shown, for a sheet 11 of paper to be printed. The microprocessor 6 also controls the voltage setting of the supply source 20.

The data of a line arrive in the reception register 8 at an average speed Y. The head 1 prints, under nominal conditions, at a nominal speed XO which is less than the speed Y.

The microprocessor 6 is assigned the task of managing the filling of the memory 7 and emptying it for the printing.

In order to control the writing of the data into the memory 7, the microprocessor 6 includes a pointer indicating the position, or free address, in memory 7 which follows the last position written. In the case in which the microprocessor 6 recognizes that the data received from the reception register 8 represent a line which can be printed rapidly, it prevents transfer to the memory 7 from the reception register 8 and writes one or more relatively short compression codewords, representing the line, into the memory 7.

Figure 2:
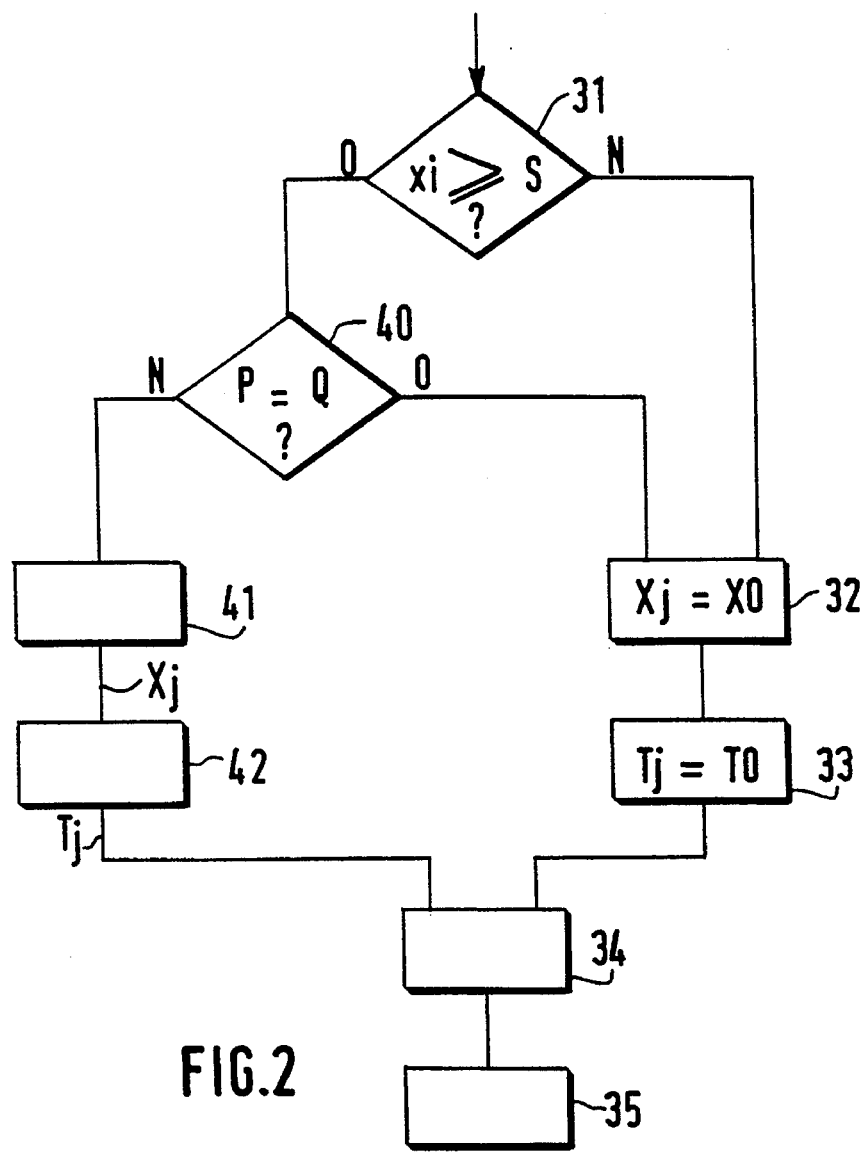
FIG. 2 is a flow chart relating to the printing of the data received.

The calculations carried out by the microprocessor 6 for determining the instantaneous printing speed Xj are explained in FIG. 2.

At a step 31, the microprocessor 6 compares with a threshold S the address Xi where the data of the line received are to be stored in memory 7. If this address Xi is less than the threshold S, the instantaneous printing speed Xj is fixed at a nominal speed XO in a step 32, for which the heating duration Tj is fixed at the nominal value TO in a step 33. In a step 34, the first line entered into the memory 7 is then dumped into the printing register 4 from the memory 7 through a decompression module 57 and under the control of the microprocessor 6. In a step 35, a pointer of the microprocessor 6, indicating the start address of the memory zone occupied is updated and the printing of the line in question takes place by sending a control activating the gates 3 via the link 5.

For simplicity of the explanation above, the memory 7 was considered to operate as a stack memory and the address of the pointer to represent the filling of the memory 7. It will be understood that, in practice, the memory 7 includes a zone of successive addresses receiving the data. This zone expands through a leading edge located on the side of the addresses where the new data are written and contracts on the side where it empties for printing. This zone thus propagates from a minimum address to a maximum address and, when the latter is reached, continues to progress by looping its filling leading edge back onto the minimum address which has previously been cleared. The volume xi occupied by the data is therefore actually defined on the basis of two pointers which each indicate one of the ends of this occupied zone.

If, in step 31, the address xi is greater than or equal to the threshold S, the microprocessor 6 examines, in a step 40, whether the number Q representing the rank on the page to be printed of the line in question, determined by counting from the reception of data indicating a new page, is equal to the maximum number P of lines per page. In the event of equality, step 32 is returned too. Otherwise, in a step 41, the instantaneous printing speed Xj is calculated, in this case according to the formula:

$$\Delta Xj=Y.(P-Q)/(L-xi)$$

$\Delta Xj$ being the difference in the instantaneous speed Xj calculated with respect to the nominal speed XO, ie.:

$$Xj=XO+\Delta Xj$$

and L: capacity of the memory 7.
In a step 42, the heating duration Tj is calculated by the formula:

$$Tj=TO.XO/Xj$$

then step 34 is returned to.
However, and more simply, if in step 31 the address Xi is greater than or equal to the threshold S, the maximum printing speed may be commanded, even though this means tolerating a degradation of the printing quality.

Figure 3:
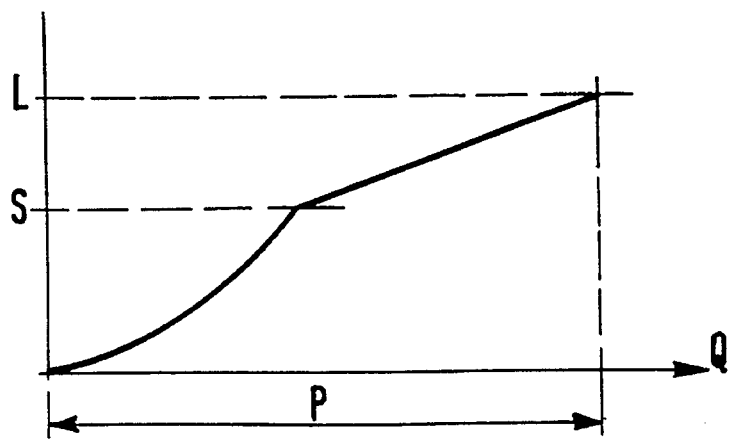
FIG. 3 illustrates the change in the filling of a memory containing lines to be printed.

FIG. 3 illustrates the change in the degree of filling of the memory 7 as a function of the position of the lines of a page with P lines, the slope of the curve indicating the filling speed.

I claim:

1. A printing apparatus including a printing head (1), characterized in that the printing apparatus comprises a buffer memory (7) adapted to be filled, at a defined speed, by data representing lines to be printed on a printing medium (11) and to be emptied line by line for each printing of a line by the head, and computation means (6) adapted to determine, prior to printing of each line, volume of buffer memory (7) available (L–xi), to determine therefrom a printing speed (Xj) of the line in question and accordingly to permit control of means (3) for adjusting printing speed (Xj) of the head (1).

2. The printing apparatus according to claim 1, wherein the computation means (6) are adapted to write into the memory (7), in a form of at least one codeword, data representing a line.

3. The printing apparatus according to claim 2, wherein the computation means (6) are adapted to control line feed means (10) of means for driving the printing medium (11).

4. The printing apparatus according to claim 1, wherein the data to be printed are the data of a page and the computation means (6) are adapted to determine position on the page of a line to be printed and to determine corresponding print speed (Xj) as a function of the position.

5. The printing apparatus according to claim 1, wherein the printing head (1) is a thermal head and the means for adjusting the printing speed include means (6, 20) for adjusting activation of the head (1).

* * * * *